US009239124B2

(12) United States Patent
Nakamura

(10) Patent No.: US 9,239,124 B2
(45) Date of Patent: Jan. 19, 2016

(54) HOSE CLAMP

(75) Inventor: Yuji Nakamura, Aichi (JP)

(73) Assignee: Togo Seisakusyo Corporation, Aichi-Ken (JP)

( * ) Notice: Subject to any disclaimer, the term of this patent is extended or adjusted under 35 U.S.C. 154(b) by 132 days.

(21) Appl. No.: 13/979,366

(22) PCT Filed: Jan. 31, 2012

(86) PCT No.: PCT/JP2012/050596
§ 371 (c)(1),
(2), (4) Date: Jul. 11, 2013

(87) PCT Pub. No.: WO2012/096375
PCT Pub. Date: Jul. 19, 2012

(65) Prior Publication Data

US 2013/0291345 A1 Nov. 7, 2013

(30) Foreign Application Priority Data

Jan. 14, 2011 (WO) .................. PCT/JP2011/050540
Jan. 14, 2011 (WO) .................. PCT/JP2011/050542

(51) Int. Cl.
*F16L 33/03* (2006.01)

(52) U.S. Cl.
CPC .............. *F16L 33/03* (2013.01); *Y10T 24/1457* (2015.01); *Y10T 24/1463* (2015.01); *Y10T 24/1484* (2015.01)

(58) Field of Classification Search
CPC . F16L 33/03; Y10T 24/1457; Y10T 24/1463; Y10T 24/1484; B65D 63/02
See application file for complete search history.

(56) References Cited

U.S. PATENT DOCUMENTS

| | | | |
|---|---|---|---|
| 5,819,376 | A | 10/1998 | Kovalsky et al. |
| 6,438,801 | B1 | 8/2002 | Yamada |
| 2010/0083472 | A1 | 4/2010 | Nakamura |

FOREIGN PATENT DOCUMENTS

| | | | |
|---|---|---|---|
| JP | 2001-090886 | A | 4/2001 |
| JP | 2001-159491 | A | 6/2001 |
| JP | 2001-280566 | A | 10/2001 |
| JP | 2003-090474 | A | 3/2003 |
| WO | WO 2008/126754 | A1 | 10/2008 |

*Primary Examiner* — Abigail Morrell
(74) *Attorney, Agent, or Firm* — Christensen Fonder P.A.

(57) ABSTRACT

A hose clamp for preventing a leak during tightening of a hose includes a clamp body of a strip-shaped leaf spring material with an annular shape, and a pair of operation pieces. The clamp body maintained in a diameter expansion state by a locking claw of the operation piece engaged with an engagement concavity of the other operation piece. The engagement released by bringing the operation piece close to the other operation piece and moving the operation piece in the opposing direction in an axial direction of the clamp body, whereby reducing the clamp body diameter. An expansion restricting piece restricts divergence of both the operation pieces in opposite directions in the axial direction of the clamp body. Further, a tilt prevention section which prevents the clamp body from being obliquely assembled to a hose during tightening of the hose is provided.

8 Claims, 11 Drawing Sheets

HOSE CLAMP

PRIORITY CLAIM

The present application is a National Phase entry of PCT Application No. PCT/JP2012/050596, filed Jan. 13, 2012, which claims priority to PCT Application No. PCT/JP2011/050542, filed Jan. 14, 2011, and PCT Application No. PCT/JP2011/050540, filed Jan. 14, 2011, the disclosure of which are hereby incorporated by reference herein in their entirety.

TECHNICAL FIELD

The present invention relates to a hose clamp tightening a hose or the like made of rubber to a connection pipe, and in particular to a hose clamp of a so-called holderless type in which it is possible to maintain a diameter expansion state thereof without using a holder.

BACKGROUND ART

A hose clamp according to an example of the related art (refer to JP-A-2001-280566, for example) will be described. FIG. 16 is a perspective view showing the hose clamp.

As shown in FIG. 16, a hose clamp 100 includes a clamp body 101 formed by bending a metal strip into an annular shape, tapered portions 106 extending toward a central portion from both end portions of the clamp body 101 in a state of crossing each other in a width direction (an axial direction of the clamp body 101), and a pair of operation pieces 102A and 102B standing up in a radial direction from tips of the tapered portions 106. When the clamp body 101 is reduced in diameter, tightening of a hose (not shown) is made possible. Further, when both the operation pieces 102A and 102B are brought close to each other, the clamp body 101 is expanded in diameter. Further, a locking claw 103 is raised from the clamp body 101 near the operation piece 102A on one side. Further, on a side of the operation piece 102B on the other side, a receiving portion 104 with which the locking claw 103 is engaged so as to be capable of being disengaged is formed and also a cut-out portion 105 which allows axial overlap of the clamp body 101 with the operation piece 102A on one side to be avoided at the time of a diameter expansion is formed.

The clamp body 101 is maintained in a diameter expansion state by bringing both the operation pieces 102A and 102B of the hose clamp 100 close to each other in a circumferential direction by a pair of pliers and then making the locking claw 103 be engaged with the receiving portion 104. Further, if the hose is inserted into the clamp body 101 which is in the diameter expansion state and both the operation pieces 102A and 102B are brought close to each other in an axial direction (a width direction) of the clamp body 101 by a pair of pliers, both the operation pieces 102A and 102B are shifted in the width direction by an amount equivalent to the width of the cut-out portion 105, whereby the engagement of the locking claw 103 with the receiving portion 104 is released. Then, the clamp body 101 tightens the hose due to diameter reduction by an elastic restoring force.

SUMMARY OF THE INVENTION

Technical Problem

According to the hose clamp 100 of the example of the related art, a case is expected where at the time of release of engagement of the locking claw 103 with the receiving portion 104, both the operation pieces 102A and 102B diverge in opposite directions in the axial direction (the width direction) of the clamp body 101. In such a case, if the hose is tightened by the hose clamp 100 as it is, there is a problem in that the clamp body 101 is obliquely assembled to the hose or the gap 100S which is present between both end portions of the clamp body 101, that is, between the tapered portions 106 is enlarged, whereby an assembly defect is generated. In addition, if such an assembly defect of the clamp body 101 to the hose is generated, since generation of leak of fluid in the hose is caused, it is not preferable.

Accordingly, there has been a need for an improved hose clamp.

BRIEF SUMMARY OF THE INVENTION

That is, according to a first aspect of the invention, there is provided a hose clamp including: a clamp body formed by bending a strip-shaped leaf spring material into an annular shape; and a pair of operation sections standing up in a radial direction from both end portions of the clamp body, wherein tightening of a hose is made possible by diameter reduction by an elastic restoring force of the clamp body, the clamp body is expanded in diameter by using elastic deformation by bringing the pair of operation sections close to each other, a locking section is formed on a side of the operation section on one side of the clamp body, an engagement portion with which the locking section is engaged so as to be capable of being disengaged is formed on a side of the operation section on the other side of the clamp body, the clamp body is maintained in a diameter expansion state by engagement of the locking section with the engagement portion, when the clamp body is reduced in diameter from the diameter expansion state, the engagement of the locking section with the engagement portion is released by bringing the operation section on one side close to the operation section on the other side and moving the operation section on one side with respect to the operation section on the other side in the opposing direction in an axial direction of the clamp body, both the pair of operation sections are formed in a one-foot form, an expansion restricting section which restricts divergence in the opposing direction in the axial direction of the clamp body of the side of the operation section on one side with respect to the side of the operation section on the other side at the time of release of the engagement of the locking section with the engagement portion is provided between the side of the operation section on one side and the side of the operation section on the other side of the clamp body, and the expansion restricting section is configured by an expansion restricting piece formed at either operation section of the pair of operation sections, and a site capable of coming into contact with the expansion restricting piece on the remaining operation section side. With such a configuration, the clamp body is maintained in the diameter expansion state, a so-called temporarily assembled state, by making the locking section on the side of the operation section on one side be engaged with the engagement portion on the side of the operation section on the other side. Further, if in a state where the hose is inserted in the clamp body which is in the temporarily assembled state, engagement of the locking section with the engagement portion is released by bringing the operation section on one side close to the operation section on the other side, the clamp body is reduced in diameter by the elastic restoring force thereof. In this way, the hose is tightened by the elastic restoring force of the clamp body. Then, at the time of release of the engagement of the locking section with the engagement portion, divergence in the opposing direction in the axial direction of the clamp body of the side of the operation section on one side with respect to the side of the operation section on the other side is restricted by contact between the expansion restricting piece of the expansion restricting section provided between the side of the operation section on one side and the side of the operation section on the other side of the clamp body and the site capable of coming into contact with the expansion restricting piece. For this reason, an assembly defect of the clamp body due to oblique assembly of the clamp body to the hose or enlargement of the gap between both end portions of the clamp body can be prevented. Furthermore, leak of fluid in the hose due to the assembly defect of the clamp body can be prevented.

Further, according to a second aspect of this disclosure, the clamp body has side edges inclined with respect to a straight line extending in a circumferential direction, and tilt prevention sections which prevent radially inward tilt of the side edges by coming into contact with the hose during tightening of the hose are provided at the inclined side edges. With such a configuration, during tightening of the hose, the tilt prevention sections come into contact with the hose, whereby radially inward tilt of the inclined side edges of the clamp body can be prevented.

Further, according to a third aspect of this disclosure, the expansion restricting piece is formed at the operation section on the other side, and the site capable of coming into contact with the expansion restricting piece is the locking section.

Further, according to a fourth aspect of this disclosure, a leak prevention section which approximately comes into contact with an area between both end portions of the clamp body in the axial direction of the clamp body and presses the hose during tightening of the hose is provided. With such a configuration, during tightening of the hose, both end portions of the clamp body approximately come into contact with each other in the axial direction of the clamp body with the leak prevention section interposed therebetween and the leak prevention section presses the hose. Therefore, a leak flow path which is generated in a portion in which surface pressure due to the clamp body is low in the gap between both end portions of the clamp body in the hose can be shut off by pressing of the leak prevention section. In this way, leak of fluid in the hose which is generated during tightening of the hose can be prevented. In addition, the expression “approximately come into contact with” as referred to in this specification means coming into contact with or coming close to.

DETAILED DESCRIPTION OF THE INVENTION

Hereinafter, a mode for carrying out the invention will be described using the drawings.

Embodiment 1

Figure 1:
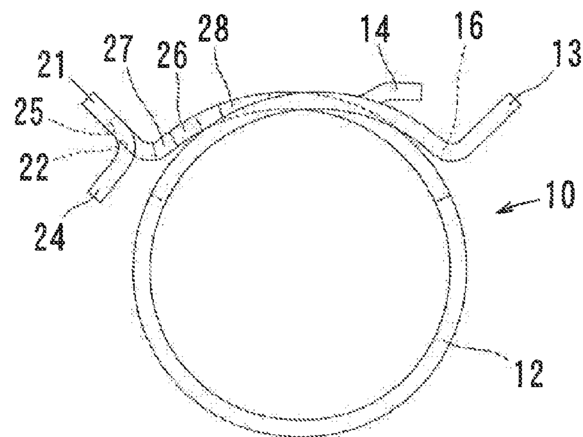
FIG. 1 is a front view showing a free state of a hose clamp according to Embodiment 1.

Embodiment 1 will be described. FIG. 1 is a front view showing a free state of a hose clamp and FIG. 2 is a development diagram of the hose clamp.

Figure 2:
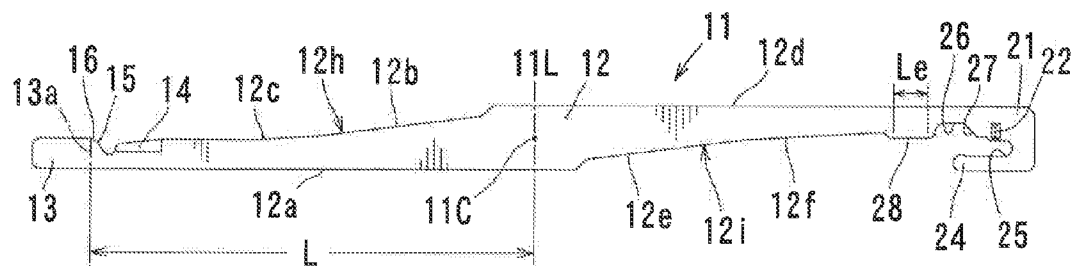
FIG. 2 is a development diagram of the hose clamp.

As shown in FIG. 2, a blank 11 made of a strip-shaped metallic plate spring material is formed by press-forming on the basis of the developed shape of a hose clamp, and a hose clamp 10 (refer to FIG. 1) is formed by bending-forming the blank 11. In addition, in FIG. 2, reference numerals equivalent to the respective sections of the hose clamp 10 are given.

As shown in FIG. 1, the hose clamp 10 is configured to include a clamp body 12 which is formed by bending a main body section of the blank 11 into an annular shape, and a pair of operation pieces 13 and 21 which is formed by bending both end portions of the blank 11 into a shape in which the operation pieces 13 and 21 stand up radially outward from both end portions of the clamp body 12. Each of both the operation pieces 13 and 21 is formed in a one-foot form. Further, when both the operation pieces 13 and 21 are brought close to each other, the clamp body 12 is expanded in diameter by using elastic deformation thereof. Further, when the clamp body 12 is reduced in diameter from a diameter expansion state by an elastic restoring force thereof, tightening of a hose is possible. In addition, both the operation pieces 13 and 21 are respectively equivalent to "operation sections" as referred to in this specification. Further, for convenience of description, the operation piece 13 on one side is referred to as a "first operation piece 13" and the operation piece 21 on the other side is referred to as a "second operation piece 21". Further, a direction in the hose clamp 10 is set to be defined on the basis of the front view of FIG. 1. Further, the front-back direction of the clamp body 12 is equivalent to an "axial direction" or a "width direction".

The clamp body 12 is formed so as to have a shape in which gradual tapers are made toward end portions of the respective operation pieces 13 and 21 sides from a central portion in a circumferential direction thereof. Specifically, as shown in FIG. 2, in the blank 11, a front edge 12*a* of a half body portion on the first operation piece 13 side of the clamp body 12 is formed in a straight line shape perpendicular to a center line 11L of the blank 11. Further, a rear edge (denoted by reference numeral 12*h*) of the half body portion on the first operation piece 13 side of the clamp body 12 is formed in a two-step tapered shape having a base-side tapered portion 12*b* and a tip-side tapered portion 12*c* which extend toward a tip portion side on the first operation piece 13 side from the vicinity of the central portion of the clamp body 12. The base-side tapered portion 12*b* and the tip-side tapered portion 12*c* form the rear edge 12*h* into a concave shape. That is, the tip-side tapered portion 12*c* has a gently tapered shape, compared to the base-side tapered portion 12*b*. Further, a half body portion on the second operation piece 21 side of the clamp body 12 is formed in a point symmetrical shape with a center point 11C of the blank 11 as the center, with respect to the half body portion on the first operation piece 13 side of the clamp body 12. For this reason, at the half body portion on the second operation piece 21 side of the clamp body 12, a rear edge 12*d* having a straight line shape perpendicular to the center line 11L of the blank 11 and a front edge (denoted by reference numeral 12*i*) having a two-step tapered shape having a base-side tapered portion 12*e* and a tip-side tapered portion 12*f* which extend toward a tip portion side on the second operation piece 21 side from the vicinity of the central portion of the clamp body 12 are formed. Further, the second operation piece 21 is formed in a wide width shape having a front edge which is located on the same plane as the front edge 12*a* of the half body portion on the first operation piece 13 side of the clamp body 12.

By forming the clamp body 12 so as to have a shape in which gradual tapers are made toward the end portions on the respective operation pieces 13 and 21 sides from the central portion, it is possible to make the shape of the clamp body 12 close to a shape that conforms to Castigliano's theorem. For this reason, it is possible to improve roundness associated with a change in the inner diameter of the clamp body 12, thereby equalizing surface pressure distribution. In addition, each of the rear edge 12*h* of the half body portion on the first operation piece 13 side of the clamp body 12 and the front edge 12*i* of the half body portion on the second operation piece 21 side of the clamp body 12 is not limited to the two-step tapered shape and may be formed in a one-step tapered shape. In addition, since the rear edge 12*h* and the front edge 12*i* are side edges inclined with respect to a straight line perpendicular to the center line 11L of the blank 11, the rear edge 12*h* or the front edge 12*i* is equivalent to an "inclined side edge", an "inclined front edge", or an "inclined rear edge" as referred to in this specification. Further, the rear edge 12*h* and the front edge 12*i* are equivalent to side edges inclined with respect to a straight line extending in a circumferential direction of the clamp body 12.

As shown in FIG. 1, when the clamp body 12 has been bent and formed in an annular shape, an end portion on the first operation piece 13 side and an end portion on the second operation piece 21 side face each other in a state of crossing each other in the axial direction (the width direction) of the clamp body 12. That is, the clamp body 12 is bent and formed in a hollow cylindrical shape so as to enter a state where the end portion on the first operation piece 13 side is located on the side to the front (the side to the front of the plane of paper in FIG. 1) of the end portion on the second operation piece 21 side. Further, in a free state (refer to FIG. 1) of the hose clamp 10, both the operation pieces 13 and 21 enter neutral states in which the operation pieces 13 and 21 face each other in a state of forming a shape in which the operation pieces 13 and 21 are parallel to each other. Further, in the free state of the hose clamp 10, the gap between the facing surfaces of the end portion on the first operation piece 13 side and the end portion on the second operation piece 21 side which face each other in the axial direction of the clamp body 12 becomes the smallest. In addition, FIG. 3 is a perspective view showing a peripheral portion of the first operation piece and FIG. 4 is a perspective view showing a peripheral portion of the second operation piece.

Figure 3:
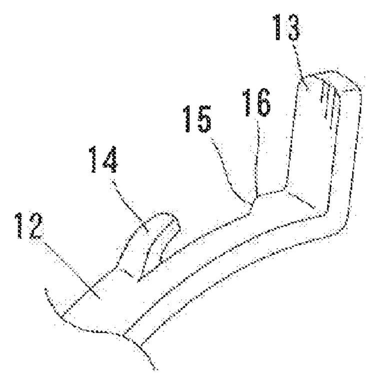
FIG. 3 is a perspective view showing a peripheral portion of a first operation piece.

As shown in FIG. 3, a locking claw 14 is formed at a rear side portion of the end portion on the first operation piece 13 side in the clamp body 12. The locking claw 14 is formed by a radially outward inclined cut and raised portion of the clamp body 12. In addition, the locking claw 14 is equivalent to a "locking section" as referred to in this specification.

Further, a guide edge 15 which is located on the first operation piece 13 side with respect to the locking claw 14 is formed at the rear side portion of the end portion on the first operation piece 13 side in the clamp body 12. The guide edge 15 is obliquely formed with a predetermined gradient such that the width (the width in the front-back direction) of the end portion on the first operation piece 13 side of the clamp body 12 is narrow on the base side and becomes wide on the tip side (the first operation piece 13 side).

Figure 4:
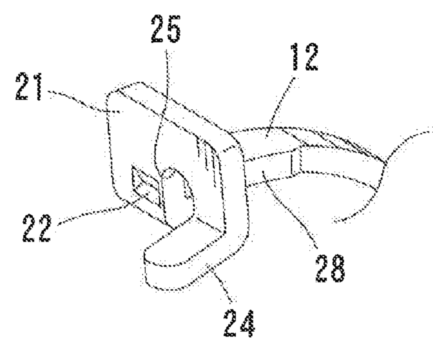
FIG. 4 is a perspective view showing a peripheral portion of a second operation piece.

As shown in FIG. 4, an engagement concavity 22 is formed in the outer surface (the surface on the opposite side to the first operation piece 13) of the second operation piece 21. The engagement concavity 22 is formed such that the locking claw 14 (refer to FIG. 3) can be engaged therewith so as to be capable of being disengaged. In addition, the engagement concavity 22 is equivalent to an "engagement portion" as referred to in this specification. Further, it is acceptable if the engagement concavity 22 has a shape to prevent a position shift in an engagement release direction of at least the locking claw 14 and a position shift of the locking claw 14 to the inside in a radial direction of the clamp body 12.

At a front side portion of the second operation piece 21, an expansion restricting piece 24 protruding in the opposing direction with respect to the first operation piece 13 in the clamp body 12 side is formed by an L-shaped bend. Further, an opening groove 25 having an inverse U-shaped groove shape is formed between the engagement concavity 22 side and the expansion restricting piece 24 side of the second operation piece 21. Further, in the free state of the hose clamp 10, that is, a neutral state in which both the operation pieces 13 and 21 face each other, the opening groove 25 and the locking claw 14 are aligned with each other in the axial direction of the clamp body 12. In addition, the expansion restricting piece 24 and the locking claw 14 configure an "expansion restricting section" as referred to in this specification.

As shown in FIG. 1, a receiving groove 26 (refer to FIG. 2) having a concave groove shape is formed in the front side portion of the end portion on the second operation piece 21 side in the clamp body 12. A groove wall on the second operation piece 21 side of the receiving groove 26 becomes a guide edge 27. The guide edge 27 is obliquely formed with a predetermined gradient such that the width (the width in a transverse direction) of the end portion on the second operation piece 21 side of the clamp body 12 is narrow on the base side and becomes wide on the tip side (the second operation piece 21 side). Further, the guide edge 27 is formed such that the guide edge 27 can come into contact with and slide on the guide edge 15 on the first operation piece 13 side. In addition, both the guide edges 15 and 27 configure a "guide mechanism" as referred to in this specification.

A leak prevention piece 28 which is located on the base side with respect to the receiving groove 26 protrudes from the front edge (an edge on a side facing the end portion on the first operation piece 13 side) of the end portion on the second operation piece 21 side in the clamp body 12 (refer to FIG. 1). A front end edge (a tip edge) of the leak prevention piece 28 is formed in a straight line shape having a predetermined length Le (refer to FIG. 2) and extending in a circumferential direction. Further, a contact portion (denoted by reference numeral 16) set between the guide edge 15 of the rear edge (the facing side edge) of the end portion on the first operation piece 13 side in the clamp body 12 in a hose tightened state (described later) of the hose clamp 10 and a base end portion (a bending termination portion of the clamp body 12) 13*a* of the first operation piece 13 can come into contact with the tip edge of the leak prevention piece 28 in the form of point contact. In addition, the leak prevention piece 28 and the contact portion 16 configure a "leak prevention section" as referred to in this specification.

Next, a case of tightening a hose by using the hose clamp 10 will be described.

Figure 5:
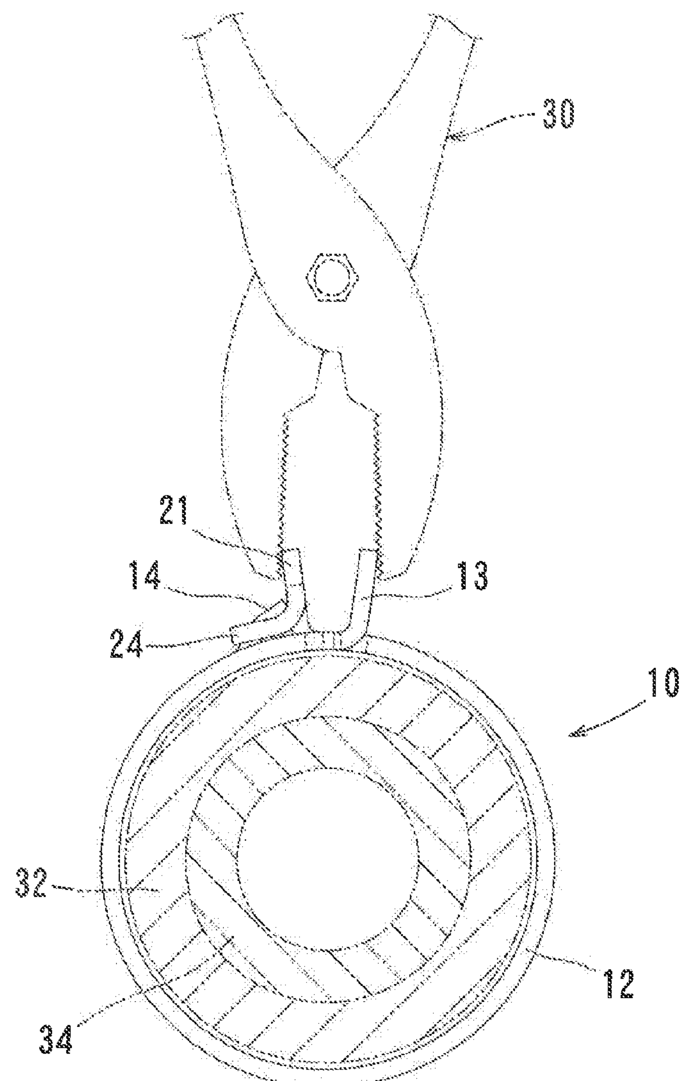
FIG. 5 is a front view showing a temporarily assembled state of the hose clamp.

First, both the operation pieces 13 and 21 of the hose clamp 10 (refer to FIG. 1) in the free state are gripped by a tool 30 (refer to FIG. 5) such as a pair of pliers or a pair of pincers and brought close to each other by using elastic deformation of the clamp body 12. In this way, the clamp body 12 is expanded in diameter and the locking claw 14 on the first operation piece 13 side passes through the opening groove 25 of the second operation piece 21. Then, grip on both the operation pieces 13 and 21 by the tool 30 is released in a state (a position-shifted state) where the first operation piece 13 is offset with respect to the second operation piece 21 in the opposite direction, that is, to the rear (backward in the plane of paper in FIG. 1) in the axial direction by using the elastic deformation of the clamp body 12. Then, the locking claw 14 on the first operation piece 13 side is engaged with the engagement concavity 22 of the second operation piece 21 with the elastic restoring force of the clamp body 12 (refer to FIG. 7). In this way, the clamp body 12 is maintained in a diameter expansion state (refer to FIGS. 5 and 6). This state is referred to as a temporarily assembled state of the hose clamp 10. In addition, FIG. 5 is a front view showing the temporarily assembled state of the hose clamp, FIG. 6 is a plan view of the same, and FIG. 7 is a perspective view likewise showing the peripheral portions of both the operation pieces.

Figure 6:
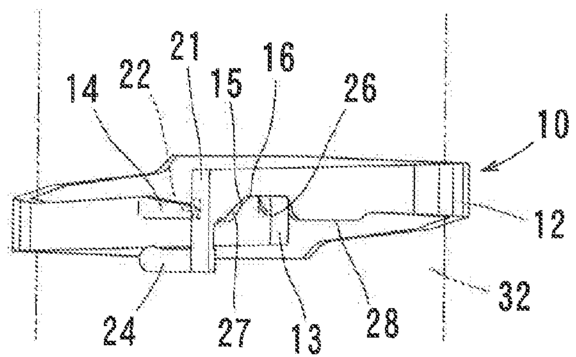
FIG. 6 is a plan view showing the temporarily assembled state of the hose clamp.
Figure 7:
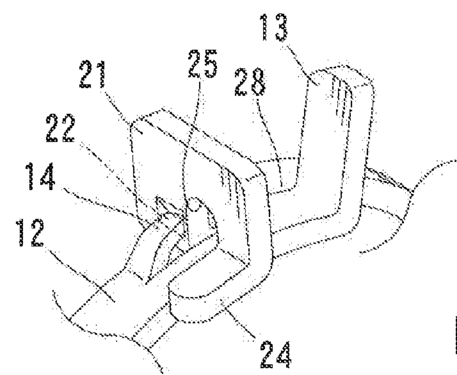
FIG. 7 is a perspective view showing the peripheral portions of both the operation pieces in the temporarily assembled state.

As shown in FIG. 6, in the temporarily assembled state of the hose clamp 10, the rear half portion which includes the guide edge 15 of the end portion on the first operation piece 13 side in the clamp body 12 is fitted into the receiving groove 26 on the second operation piece 21 side and the guide edge 27 of the receiving grove 26 and the guide edge 15 on the first operation piece 13 side are brought close to each other. In addition, the hose clamp 10 is carried into a working site related to tightening work of a hose in, for example, the temporarily assembled state. Further, the hose clamp 10 may be carried into a working site in the free state and then temporarily assembled at the working site.

Next, in the working site related to the tightening work of the hose, a hose 32 is inserted into the clamp body 12 of the hose clamp 10 which is in the temporarily assembled state (refer to FIG. 5), and after the hose 32 is fitted to a connection pipe 34 by using elastic deformation of the hose 32, the hose clamp 10 is located at a fastening portion of the hose 32 to the connection pipe 34. Then, both the operation pieces 13 and 21 of the hose clamp 10 are gripped by the tool 30 such as a pair of pliers or a pair of pincers and brought close to each other by using the elastic deformation of the clamp body 12 (refer to FIG. 8). In addition, FIG. 8 is a plan view showing a temporary assembly release state.

Figure 8:
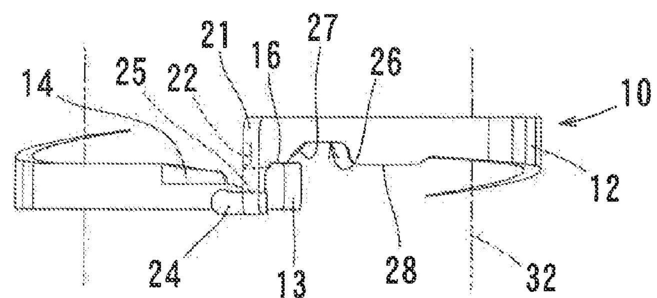
FIG. 8 is a plan view showing a temporary assembly release state.

Then, as shown in FIG. 8, as the locking claw 14 on the first operation piece 13 side breaks away from the engagement concavity 22 of the second operation piece 21, the first operation piece 13 is pushed in the opposing direction, that is, forward (downward in FIG. 8) in the axial direction of the clamp body 12 with respect to the second operation piece 21 due to sliding contact of the guide edge 15 (refer to FIG. 6) on the first operation piece 13 side with respect to the guide edge 27 on the second operation piece 21 side. Further, also by the elastic restoring force due to offset of the first operation piece 13 with respect to the second operation piece 21, a so-called offset reaction force, the first operation piece 13 is pushed in the opposing direction, that is, forward (downward in FIG. 8) in the axial direction of the clamp body 12 with respect to the second operation piece 21. In this way, the first operation piece 13 faces or approximately faces the second operation piece 21 and the opening groove 25 of the second operation piece 21 and the locking claw 14 on the first operation piece 13 side are aligned or approximately aligned with each other in the axial direction of the clamp body 12.

Figure 9:
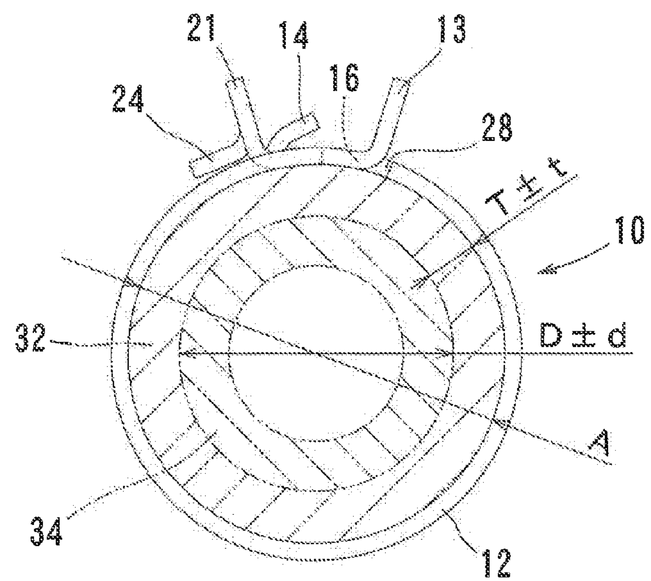
FIG. 9 is a front view showing a hose tightened state of the hose clamp.
Figure 10:
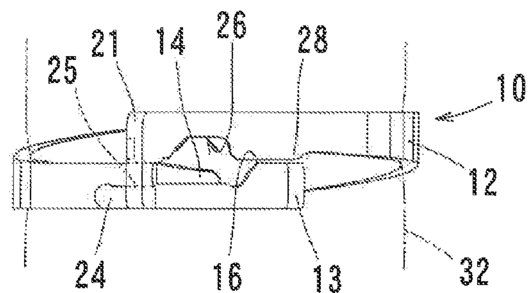
FIG. 10 is a plan view showing the hose tightened state of the hose clamp.

Subsequently, if the grip of both the operation pieces 13 and 21 by the tool 30 (refer to FIG. 5) is released, the clamp body 12 is reduced in diameter due to the elastic restoring force thereof. At this time, the locking claw 14 on the first operation piece 13 side passes through the opening groove 25 of the second operation piece 21. Further, the clamp body 12 which is reduced in diameter due to the elastic restoring force tightens the hose 32 to the connection pipe 34 (refer to FIG. 9). In addition, FIG. 9 is a front view showing a hose tightened state of the hose clamp, and FIG. 10 is a plan view of the same.

In the hose clamp 10, there is a case where at the time of release of the engagement of the locking claw 14 on the first operation piece 13 side with the engagement concavity 22 of the second operation piece 21, the first operation piece 13 side has diverged too much with respect to the second operation piece 21 side, that is, too pushed back in the opposing direction, that is, forward in the axial direction of the clamp body 12 due to the offset reaction force of the clamp body 12, or the first operation piece 13 side moves too vigorously in the same direction due to sliding contact of the guide edge 15 on the first operation piece 13 side with respect to the guide edge 27 on the second operation piece 21 side. In such a case, if the hose 32 is tightened to the connection pipe 34 by the hose clamp 10 as it is, the clamp body 12 is obliquely assembled to the hose 32 or the gap between both end portions of the clamp body 12 is enlarged, whereby it is expected that an assembly defect of the clamp body 12 will be generated.

Figure 11:
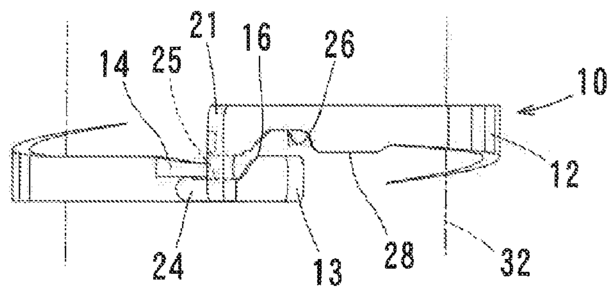
FIG. 11 is a plan view showing an operation of an expansion restricting piece.

However, according to the hose clamp 10, at the time of release of the engagement of the locking claw 14 on the first operation piece 13 side with the engagement concavity 22 of the second operation piece 21, when the first operation piece 13 side diverges with respect to the second operation piece 21 side, the locking claw 14 on the first operation piece 13 side comes into contact with the expansion restricting piece 24 of the second operation piece 21 (refer to FIG. 11). In addition, FIG. 11 is a plan view showing an operation of the expansion restricting piece.

As shown in FIG. 11, the locking claw 14 on the first operation piece 13 side comes into contact with the expansion restricting piece 24 of the second operation piece 21, whereby the expansion is restricted. For this reason, an assembly defect of the clamp body 12 to the hose 32 is prevented, and thus leak of fluid in the hose 32 due to the assembly defect can be prevented. It can be said that this is effective in a case where in the hose clamp 10 in which a temporarily assembled state is created by making the locking claw 14 be engaged with the engagement concavity 22 in a state where the first operation piece 13 side is offset to the second operation piece 21 side from the neutral state where both the operation pieces 13 and 21 face each other, at the time of release of the engagement of the locking claw 14 with the engagement concavity 22, it is expected that the first operation piece 13 side will diverge with respect to the second operation piece 21 side due to the offset reaction force of the clamp body 12.

Further, during tightening of the hose 32 (refer to FIGS. 9 and 10), both end portions of the clamp body 12, that is, the tip edge (the front end edge) of the leak prevention piece 28 on the second operation piece 21 side and the contact portion 16 on the first operation piece 13 side approximately come into contact with each other in the axial direction of the clamp body 12 (refer to FIG. 10). Further, the leak prevention piece 28 presses along with the clamp body 12 the hose 32 against the connection pipe 34 (refer to FIG. 9). Therefore, a leak flow path which is generated in a portion where surface pressure due to the clamp body 12 is low in the gap between both end portions of the clamp body 12 in the hose 32 can be shut off by the pressing of the leak prevention piece 28. In this way, leak of fluid in the hose 32 which is generated during tightening of the hose 32 can be prevented. In addition, it is preferable that the tip edge (the front end edge) of the leak prevention piece 28 and the contact portion 16 come into contact with each other. However, the tip edge (the front end edge) of the leak prevention piece 28 and the contact portion 16 may come close to each other.

Further, as shown in FIG. 9, when a range of the wall thickness of the hose 32 during tightening of the hose 32 is set to be $T \pm t$, a range of the pipe outer diameter of the connection pipe 34 is set to be $D \pm d$, and the inner diameter of the clamp body 12 of the hose clamp 10 is set to be A, a maximum value Amax of the inner diameter A of the clamp body 12 is expressed by an expression, $Amax=(D+d)+(T+t)\times 2$. Further, a minimum value Amin of the inner diameter A of the clamp body 12 is expressed by an expression, $Amin=(D-d)+(T-t)\times 2$. Therefore, the length Le of the tip edge (the front end edge) of the leak prevention piece 28 is set such that in a range from Amin to Amax of the inner diameter of the clamp body 12, the tip edge (the front end edge) of the leak prevention piece 28 and the contact portion 16 on the first operation piece 13 side can come into point contact with each other (refer to FIG. 2). In addition, in FIG. 2, L indicates a length from the center line 11L of the blank 11 (refer to FIG. 2) to the base end portion 13*a* of the first operation piece 13.

Further, each of both the operation pieces 13 and 21 is formed in a one-foot form. Therefore, the hose clamp 10 can be made more compact in the axial direction (the width direction) of the clamp body 12, compared to a case where, for example, the first operation piece 13 is formed in a one-foot form and the second operation piece 21 is formed in a two-foot form.

Next, Modified Examples 1 and 2 of the locking claw 14 of the hose clamp 10 in Embodiment 1 described above will be described. In addition, FIGS. 12 and 13 respectively are perspective views showing locking claws.

Modified Example 1 of Locking Claw

Figure 12:
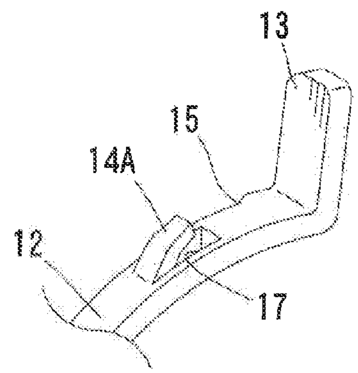
FIG. 12 is a perspective view showing Modified Example 1 of a locking claw.

In Modified Example 1 of the locking claw, as shown in FIG. 12, a U-shaped slit 17 is formed in the end portion on the first operation piece 13 side in the clamp body 12 and a claw-shaped portion due to the slit 17 is obliquely raised radially outward, whereby a locking claw 14 (with sign A added thereto) is formed.

Modified Example 2 of Locking Claw

Figure 13:
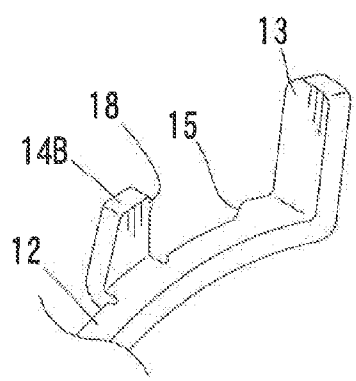
FIG. 13 is a perspective view showing Modified Example 2 of the locking claw.

In Modified Example 2 of the locking claw, as shown in FIG. 13, a locking claw 14 (with sign B added thereto) is formed by bending radially outward a protruding piece which protrudes from the rear edge of the end portion on the first operation piece 13 side in the clamp body 12, in a standing-up shape. At a tip portion of the locking claw 14B, a projection 18 which is engaged with the engagement concavity 22 (refer to FIG. 4) of the second operation piece 21 is formed.

Next, Modified Examples 1 and 2 of the expansion restricting piece 24 of the hose clamp 10 in Embodiment 1 described above will be described. In addition, FIGS. 14 and 15 respectively are perspective views showing expansion restricting pieces.

Modified Example 1 of Expansion Restricting Piece

Figure 14:
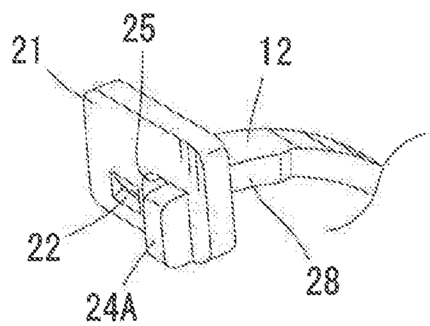
FIG. 14 is a perspective view showing Modified Example 1 of an expansion restricting piece.

In Modified Example 1 of the expansion restricting piece, as shown in FIG. 14, an expansion restricting piece 24 (with sign A added thereto) is formed by bending a protruding piece which protrudes from a side edge portion on the front side of the opening groove 25 of the second operation piece 21 in the clamp body 12, in a standing-up shape.

Modified Example 2 of Expansion Restricting Piece

Figure 15:
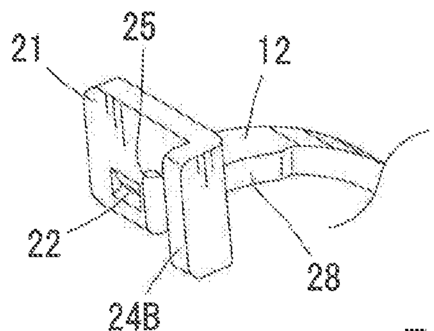
FIG. 15 is a perspective view showing Modified Example 2 of the expansion restricting piece.
Figure 16:
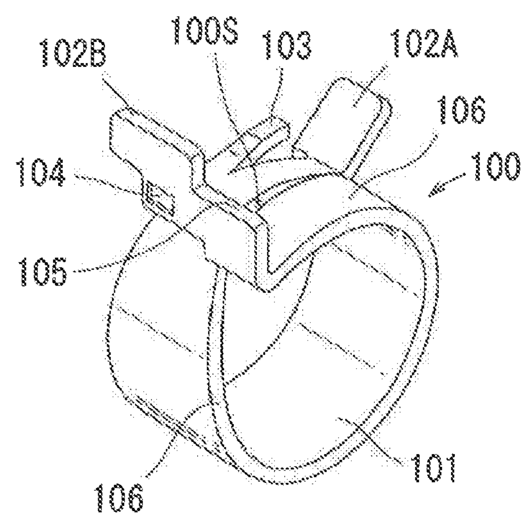
FIG. 16 is a perspective view showing a hose clamp according to an example of the related art.

In Modified Example 2 of the expansion restricting piece, as shown in FIG. 15, an expansion restricting piece 24 (with sign B added thereto) is formed by bending a protruding piece which protrudes from the front edge of the second operation piece 21 in the clamp body 12, in a standing-up shape.

Embodiment 2

Figure 17:
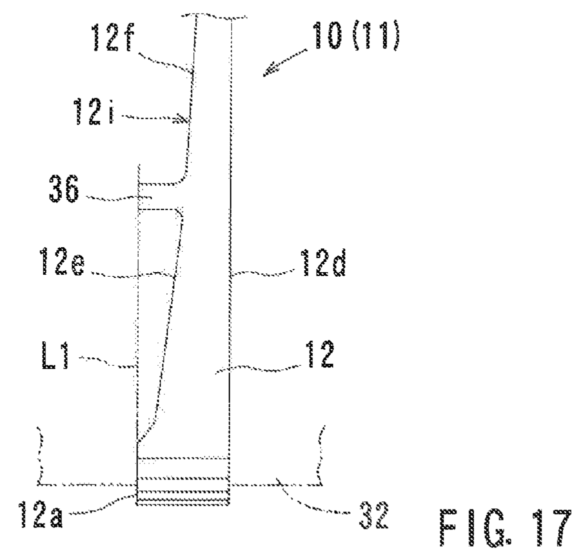
FIG. 17 is a side view showing a peripheral portion of a tilt prevention piece according to Embodiment 2.

Embodiment 2 will be described. Since this embodiment is an embodiment in which a change is applied to Embodiment 1 described above, description is made with regard to the changed section and overlapping description is omitted. FIG. 17 is a side view showing a peripheral portion of a tilt prevention piece, FIG. 18 is a front view of the same, and FIG. 19 is a development diagram of a hose clamp.

Figure 19:
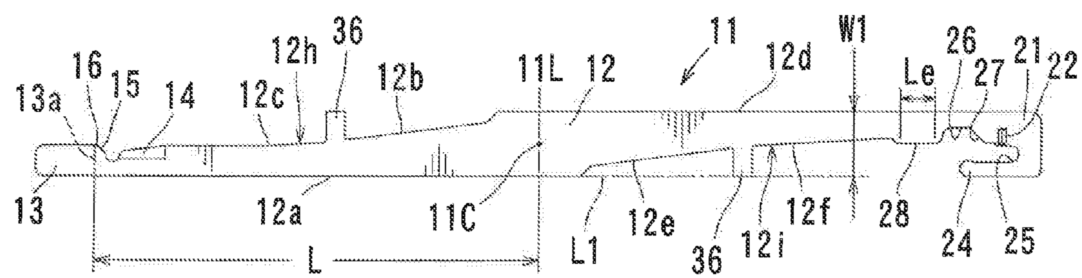
FIG. 19 is a development diagram of a hose clamp.

In this embodiment, as shown in FIG. 19, a tilt prevention piece 36 which protrudes outward in the axial direction of the clamp body 12 (upward in FIG. 19) is formed in a protrusion piece shape at a central portion of the rear edge (the inclined side edge) 12*h* of the half body portion on the first operation piece 13 side of the clamp body 12 in Embodiment 1 described above. The tilt prevention piece 36 is disposed at, for example, the tip-side end portion (the end portion on the tapered portion 12*c* side) in the base-side tapered portion 12*b*. Further, also in this embodiment, similarly to Embodiment 1 (refer to FIG. 2) described above, the half body portion on the second operation piece 21 side of the clamp body 12 is formed in a point symmetrical shape with the center point 11C of the blank 11 as the center, with respect to the half body portion on the first operation piece 13 side of the clamp body 12. For this reason, a tilt prevention piece 36 (for convenience, denoted by the same reference numeral) which protrudes outward in the axial direction of the clamp body 12 (downward in FIG. 19) is also formed at a central portion of the front edge (the inclined front edge) 12*i* of the half body portion on the second operation piece 21 side of the clamp body 12. In addition, since the tilt prevention piece 36 in the half body portion on the first operation piece 13 side of the clamp body 12 and the tilt prevention piece 36 in the half body portion on the second operation piece 21 side of the clamp body 12 have the same configuration and exhibit the same operation and effects, hereinafter, description is made with regard to the tilt prevention piece 36 of the half body portion on the second operation piece 21 side and description of the tilt prevention piece 36 of the half body portion on the first operation piece 13 side is omitted.

The tilt prevention piece 36 is formed with the amount of protrusion which does not exceed a straight line L1 extending along the front edge 12*a* of the half body portion on the first operation piece 13 side of the clamp body 12. In this embodiment, the width dimension of a portion which includes the tilt prevention piece 36 is set so as to become equal to an overall width (that is, the dimension between the rear edge 12*d* of the half body portion on the second operation piece 21 side of the clamp body 12 and the front edge 12*a* of the half body portion on the first operation piece 13 side) W1 in the axial direction of the clamp body 12. In addition, the tilt prevention piece 36 is equivalent to a "tilt prevention section" as referred to in this specification.

Figure 18:
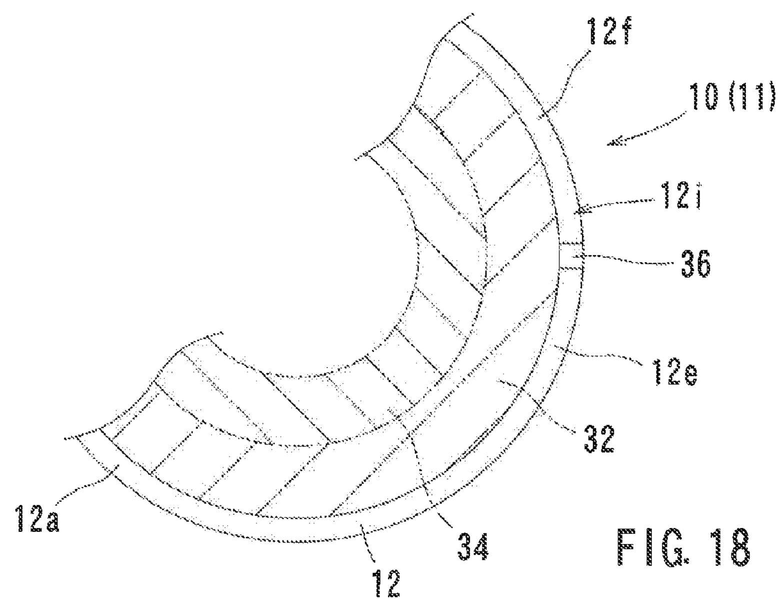
FIG. 18 is a front view showing the peripheral portion of the tilt prevention piece.

According to this embodiment, as shown in FIGS. 17 and 18, during tightening of the hose 32, the tilt prevention piece 36 comes into contact with the hose 32 (specifically, the outer peripheral surface), whereby a radially inward (backward in the plane of paper in FIG. 17) tilt of the inclined front edge 12*i* of the clamp body 12 can be prevented. For this reason, a surface pressure distribution of the clamp body 12 with respect to the hose 32 can be equalized.

In this regard, detailed description will be made. In the case of a hose clamp having no tilt prevention piece 36, during tightening of the hose 32, the inclined front edge 12*i* in the half body portion on the second operation piece 21 side of the clamp body 12 is easily tilted radially inward (backward in the plane of paper in FIG. 17) in terms of a shape, compared to the rear edge 12*d* of the half body portion, and an obliquely assembled state is easily maintained, and thus there is a tendency that it is difficult for the clamp body 12 to naturally adapt to the hose 32. Then, in a case where the hose 32 is tightened in a state where the front edge 12*i* in the half body portion on the second operation piece 21 side of the clamp body 12 is tilted, the amount of position shift to the front (the left side in FIG. 17) of the half body portion becomes large, whereby the clamp body 12 is not reduced in diameter to a predetermined diameter, and thus there is a case where the clamp body 12 is not uniformly wound around the hose 32. When this is excessive, there is a case where the surface pressure of the clamp body 12 with respect to the hose 32 is lowered enough for a gap to be formed with respect to the hose 32 at the central portion in the circumferential direction of the clamp body 12. Therefore, a case is expected where a tightening force of the clamp body 12 to the hose 32 will be lowered, thereby causing deterioration of withstanding pressure performance.

In contrast to this, according to this embodiment, at the central portion of the inclined front edge 12*i* of the half body portion on the second operation piece 21 side of the clamp body 12, the tilt prevention piece 36 which prevents a radially inward tilt of the side edge 12*i* by coming into contact with the hose 32 during tightening of the hose 32 is provided. Therefore, during tightening of the hose 32, the tilt prevention piece 36 comes into contact with the hose 32, whereby a radially inward tilt of the front edge 12*i* of the clamp body 12 can be prevented. For this reason, the surface pressure distribution of the clamp body 12 with respect to the hose 32 can be equalized. Furthermore, a tightening force of the clamp body 12 to the hose 32 is improved, and thus withstanding pressure performance can be improved.

In addition, the tilt prevention piece 36 on any one side in this embodiment may be omitted. Further, the disposition position, the shape, the number, or the like of the tilt prevention piece 36 can be appropriately selected. Further, the width dimension of the portion which includes the tilt prevention piece 36 may be smaller than the overall width W1 in the axial direction of the clamp body 12.

Embodiment 3

Figure 20:
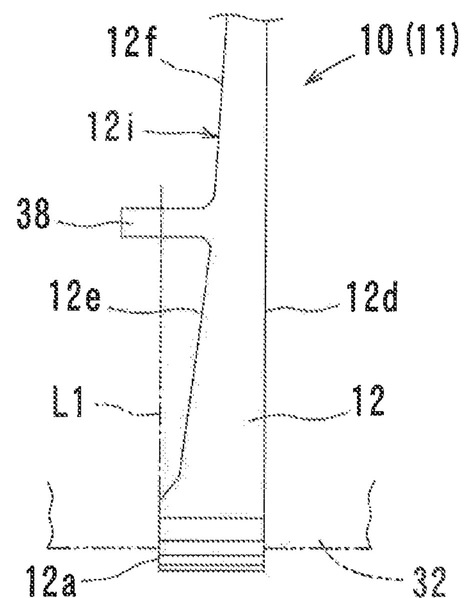
FIG. 20 is a side view showing a peripheral portion of a tilt prevention piece according to Embodiment 3.

Embodiment 3 will be described. Since this embodiment and subsequent embodiments are modified examples of the tilt preventing piece 36 of Embodiment 2 described above, description is made with regard to the changed sections and overlapping description is omitted. FIG. 20 is a side view showing a peripheral portion of a tilt prevention piece.

As shown in FIG. 20, a tilt prevention piece (denoted by reference numeral 38) in this embodiment is formed with the amount of protrusion which exceeds the straight line L1 extending along the front edge 12*a* of the half body portion on the first operation piece 13 side of the clamp body 12. According to this embodiment, since the amount of protrusion of the tilt prevention piece 38 is increased, the effect of preventing a radially inward (backward in the plane of paper in FIG. 20) tilt of the inclined front edge 12*i* of the clamp body 12 during tightening of the hose 32 can be improved. In addition, the tilt prevention piece 38 is equivalent to a "tilt prevention section" as referred to in this specification.

Embodiment 4

Figure 21:
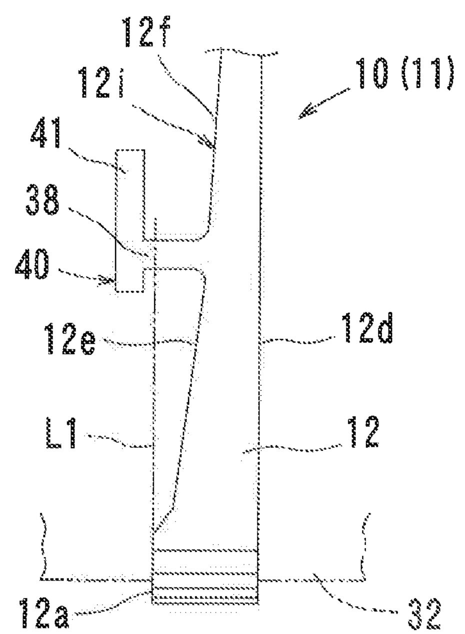
FIG. 21 is a side view showing a peripheral portion of a tilt prevention piece according to Embodiment 4.

Embodiment 4 will be described. FIG. 21 is a side view showing a peripheral portion of a tilt prevention piece.

As shown in FIG. 21, a tilt prevention piece (denoted by reference numeral 40) in this embodiment has the tilt prevention piece 38 (refer to FIG. 20) in Embodiment 3 as a main section and a circumferential protrusion portion 41 extending along the circumferential direction of the clamp body 12 in a parallel fashion is formed in a T-shape with respect to a tip portion of the main section 38. According to this embodiment, since the tilt prevention piece 40 has the circumferential protrusion portion 41, the effect of preventing a radially inward (backward in the plane of paper in FIG. 21) tilt of the inclined front edge 12*i* of the clamp body 12 during tightening of the hose 32 can be improved. Further, the tilt prevention piece 40 is prevented from being caught in the hose 32 during tightening of the hose 32, and thus adaptability of the clamp body 12 to the hose 32 can be improved. In addition, the circumferential protrusion portion 41 is not limited to a T-shape with respect to the main section 38 and may be formed in an L-shape, a Y-shape, or the like, and the shape thereof can be appropriately changed. Further, the circumferential protrusion portion 41 can also be formed with the tilt prevention piece 36 (refer to FIG. 17) in Embodiment 2 as a main section. In addition, the tilt prevention piece 40 is equivalent to a "tilt prevention section" as referred to in this specification.

Embodiment 5

Figure 22:
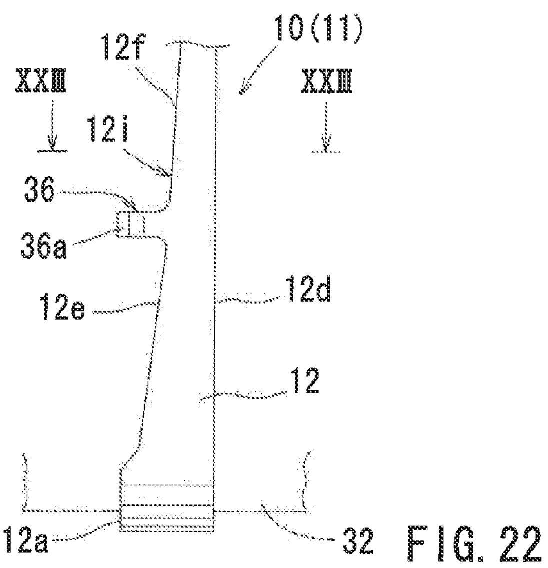
FIG. 22 is a side view showing a peripheral portion of a tilt prevention piece according to Embodiment 5.

Embodiment 5 will be described. FIG. 22 is a side view showing a peripheral portion of a tilt prevention piece and FIG. 23 is a cross-sectional view taken along line XXIII-XXIII of FIG. 22 and viewed from the direction of an arrow.

Figure 23:
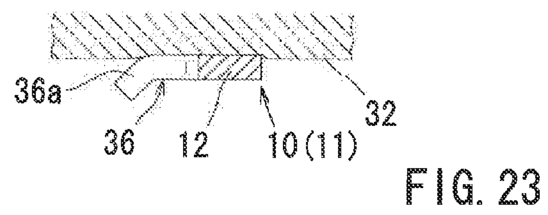
FIG. 23 is a cross-sectional view taken along line XXIII-XXIII of FIG. 22 and viewed from the direction of an arrow.

As shown in FIGS. 22 and 23, this embodiment has a configuration in which a tip portion 36*a* of the tilt prevention piece 36 (refer to FIG. 17) in Embodiment 2 described above is obliquely bent to the outside in the radial direction of the clamp body 12. According to this embodiment, the tip portion of the tilt prevention piece 36 is obliquely bent to the outside in the radial direction of the clamp body 12, whereby the tilt prevention piece 36 is prevented from being caught in the hose 32 during tightening of the hose 32, and thus adaptability of the clamp body 12 to the hose 32 can be improved.

Embodiment 6

Figure 24:
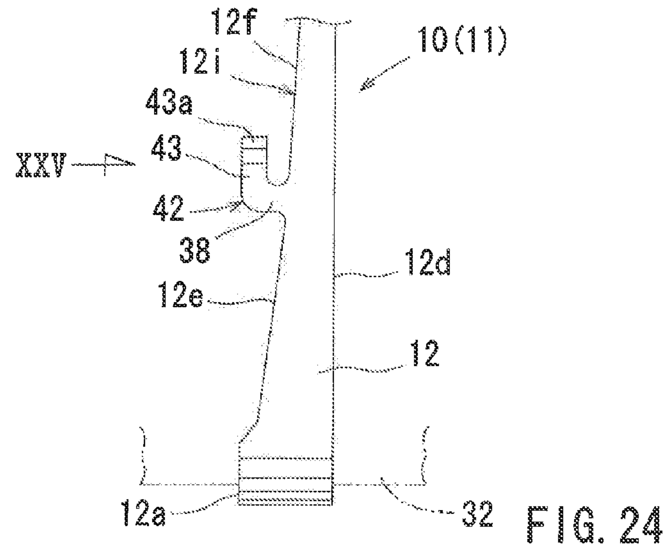
FIG. 24 is a side view showing a peripheral portion of a tilt prevention section according to Embodiment 6.

Embodiment 6 will be described. FIG. 24 is a side view showing a peripheral portion of a tilt prevention section and FIG. 25 is a view in the direction of arrow XXV of FIG. 24.

Figure 25:
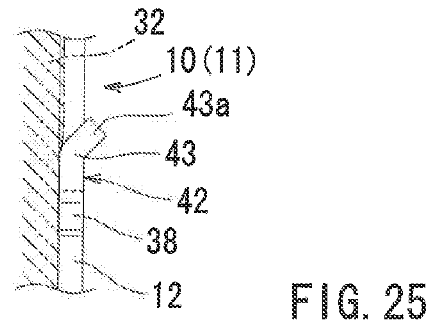
FIG. 25 is a view in the direction of arrow XXV of FIG. 24.

As shown in FIGS. 24 and 25, a tilt prevention piece (denoted by reference numeral 42) in this embodiment has the tilt prevention piece 38 (refer to FIG. 20) in Embodiment 3 as a main section and a circumferential protrusion portion 43 extending along the circumferential direction of the clamp body 12 in a parallel fashion is formed in an L-shape with respect to at a tip portion of the main section 38. In addition, a tip portion 43*a* of the circumferential protrusion portion 43 is obliquely bent to the outside in the radial direction of the clamp body 12. According to this embodiment, since the tilt prevention piece 42 has the circumferential protrusion portion 43, the effect of preventing a radially inward (backward in the plane of paper in FIG. 24) tilt of the inclined front edge 12*i* of the clamp body 12 during tightening of the hose 32 can be improved. Further, the tip portion 43*a* of the circumferential protrusion portion 43 is obliquely bent to the outside in the radial direction of the clamp body 12, whereby the circumferential protrusion portion 43 of the tilt prevention piece 42 is prevented from being caught in the hose 32 during tightening of the hose 32, and thus adaptability of the clamp body 12 to the hose 32 can be improved. In addition, the tilt prevention piece 42 is equivalent to a "tilt prevention section" as referred to in this specification.

Embodiment 7

Figure 26:
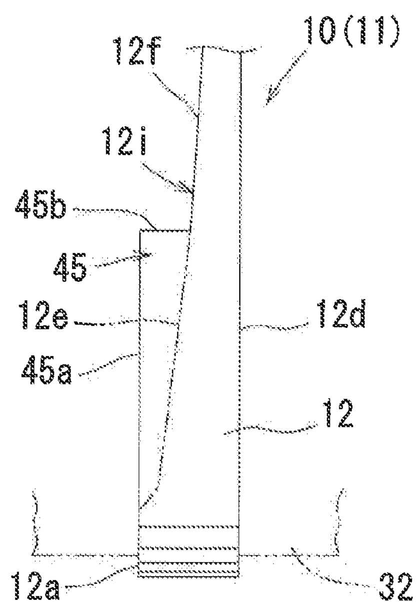
FIG. 26 is a side view showing a peripheral portion of a tilt prevention section according to Embodiment 7.

Embodiment 7 will be described. FIG. 26 is a side view showing a peripheral portion of a tilt prevention section.

As shown in FIG. 26, a tilt prevention section (denoted by reference numeral 45) in this embodiment is formed in the form of an inverted triangular plate which protrudes from the base-side tapered portion 12*e* (refer to a two-dot chain line 12*e* in FIG. 26) of the half body portion on the second operation piece 21 side of the clamp body 12 to the outside in the axial direction (the left side in FIG. 26) of the clamp body 12, and has a front edge 45*a* which is continuous with the front edge 12*a* of the half body portion on the first operation piece 13 side of the clamp body 12, and an end edge 45*b* formed parallel to the axial direction. According to this embodiment, at the inclined front edge 12*i* of the half body portion on the second operation piece 21 side of the clamp body 12, the plate-shaped tilt prevention section 45 having the circumferentially long front edge 45*a* which prevents a radially inward tilt of the side edge 12*i* by coming into contact with the hose 32 during tightening of the hose 32 is provided. Therefore, during tightening of the hose 32, the tilt prevention section 45 comes into contact with the hose 32 (specifically, the outer peripheral surface), whereby a radially inward tilt of the front edge 12*i* of the clamp body 12 can be prevented. For this reason, the surface pressure distribution of the clamp body 12 with respect to the hose 32 can be equalized. Furthermore, a tightening force of the clamp body 12 to the hose 32 is improved, and thus withstanding pressure performance can be improved.

Embodiment 8

Figure 27:
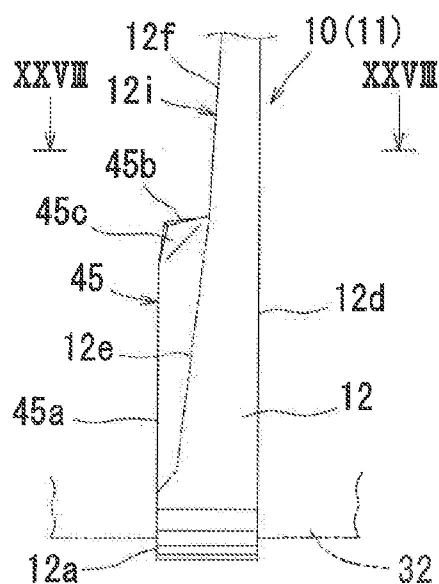
FIG. 27 is a side view showing a peripheral portion of a tilt prevention section according to Embodiment 8.

Embodiment 8 will be described. FIG. 27 is a side view showing a peripheral portion of a tilt prevention section and FIG. 28 is a cross-sectional view taken along line XXVIII-XXVIII of FIG. 27 and viewed from the direction of an arrow.

Figure 28:
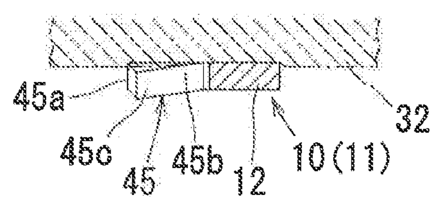
FIG. 28 is a cross-sectional view taken along line XXVIII-XXVIII of FIG. 27 and viewed from the direction of an arrow.

As shown in FIGS. 27 and 28, this embodiment has a configuration in which a corner portion 45*c* between the front edge 45*a* and the end edge 45*b* of the tilt prevention section 45 (refer to FIG. 26) in Embodiment 7 described above is obliquely bent to the outside in the radial direction (the lower side in FIG. 28) of the clamp body 12. According to this embodiment, the corner portion 45*c* of the tilt prevention section 45 is obliquely bent to the outside in the radial direction of the clamp body 12, whereby the tilt prevention section 45 is prevented from being caught in the hose 32 during tightening of the hose 32, and thus adaptability of the clamp body 12 to the hose 32 can be improved.

Embodiment 9

Figure 29:
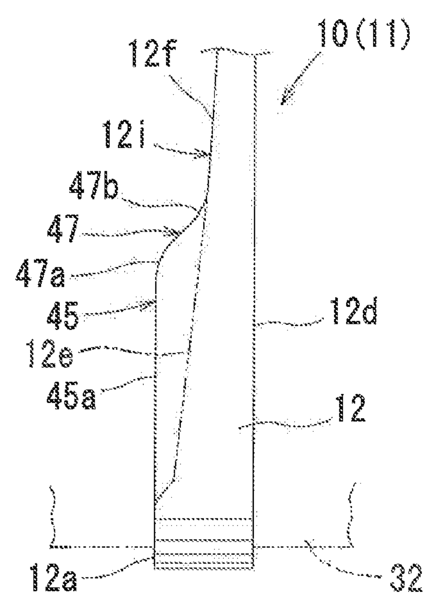
FIG. 29 is a side view showing a peripheral portion of a tilt prevention section according to Embodiment 9.

Embodiment 9 will be described. FIG. 29 is a side view showing a peripheral portion of a tilt prevention section.

As shown in FIG. 29, this embodiment has a configuration in which the front edge 45*a* of the tilt prevention section 45 (refer to FIG. 26) in Embodiment 7 described above is continuous with the tip-side tapered portion 12*f* of the clamp body 12 through a gently S-shaped curved line portion 47. That is, the curved line portion 47 has a convex R-shaped portion 47*a* which is continuous with the front edge 45*a* of the tilt prevention section 45, and a concave R-shaped portion 47*b* which is continuous with the R-shaped portion 47*a* and the tip-side tapered portion 12*f* of the clamp body 12. According to this embodiment, since the front edge 45*a* of the tilt prevention section 45 is continuous with the tip-side tapered portion 12*f* of the clamp body 12 through the curved line portion 47, sensitivity of the hose 32 with respect to the curved line portion 47 of the tilt prevention section 45 can be reduced during tightening of the hose 32. Furthermore, the tilt prevention section 45 is prevented from being caught in the hose 32, and thus adaptability of the clamp body 12 to the hose 32 can be further improved.

Embodiment 10

Figure 30:
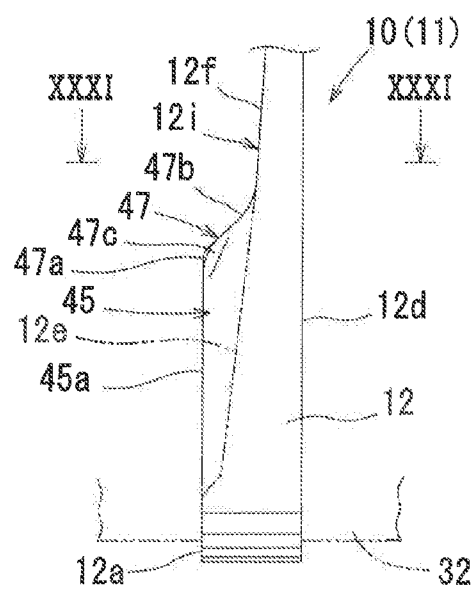
FIG. 30 is a side view showing a peripheral portion of a tilt prevention section according to Embodiment 10.

Embodiment 10 will be described. FIG. 30 is a side view showing a peripheral portion of a tilt prevention section and FIG. 31 is a cross-sectional view taken along line XXXI-XXXI of FIG. 30 and viewed from the direction of an arrow.

Figure 31:
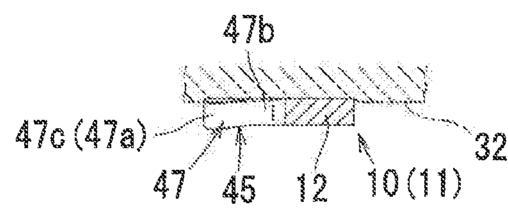
FIG. 31 is a cross-sectional view taken along line XXXI-XXXI of FIG. 30 and viewed from the direction of an arrow.

As shown in FIGS. 30 and 31, this embodiment has a configuration in which a corner portion 47*c* which includes the convex R-shaped portion 47*a* of the tilt prevention section 45 (refer to FIG. 29) in Embodiment 9 described above is bent to the outside in the radial direction of the clamp body 12 in an L-shape. According to this embodiment, the corner portion 47*c* of the curved line portion 47 of the tilt prevention section 45 is obliquely bent to the outside in the radial direction of the clamp body 12, whereby the tilt prevention section 45 is prevented from being caught in the hose 32 during tightening of the hose 32, and thus adaptability of the clamp body 12 to the hose 32 can be improved.

Embodiment 11

Figure 32:
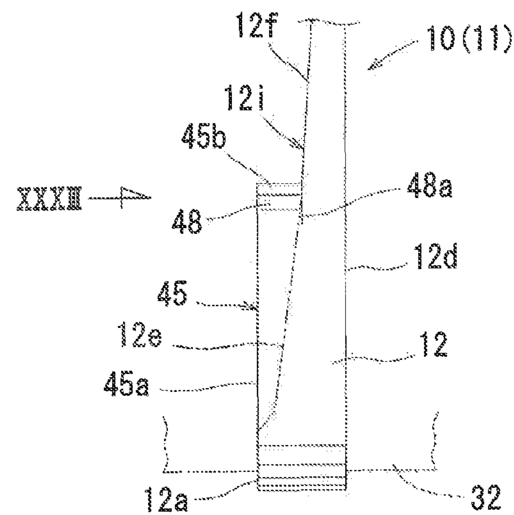
FIG. 32 is a side view showing a peripheral portion of a tilt prevention section according to Embodiment 11.

Embodiment 11 will be described. FIG. 32 is a side view showing a peripheral portion of a tilt prevention section and FIG. 33 is a view in the direction of arrow XXXIII of FIG. 32.

Figure 33:
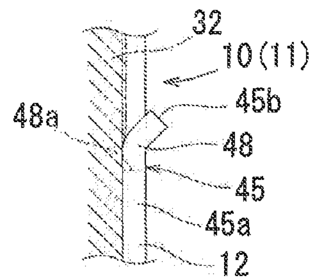
FIG. 33 is a view in the direction of arrow XXXIII of FIG. 32.

As shown in FIGS. 32 and 33, this embodiment has a configuration in which an end portion (denoted by reference numeral 48) on the end edge 45*b* side of the tilt prevention section 45 (refer to FIG. 26) in Embodiment 7 described above is obliquely cut and raised to the outside in the radial direction of the clamp body 12. In addition, a slip-shaped cutout groove 48*a* is formed between the end portion 48 and the clamp body 12. According to this embodiment, the end portion 48 of the tilt prevention section 45 is obliquely bent to the outside in the radial direction of the clamp body 12, whereby the tilt prevention section 45 is prevented from being caught in the hose 32 during tightening of the hose 32, and thus adaptability of the clamp body 12 to the hose 32 can be improved.

Embodiment 12

Figure 34:
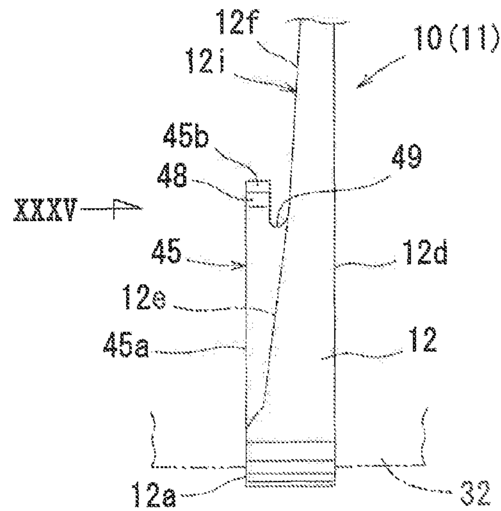
FIG. 34 is a side view showing a peripheral portion of a tilt prevention section according to Embodiment 12.

Embodiment 12 will be described. FIG. 34 is a side view showing a peripheral portion of a tilt prevention section and FIG. 35 is a view in the direction of arrow XXXV of FIG. 34.

Figure 35:
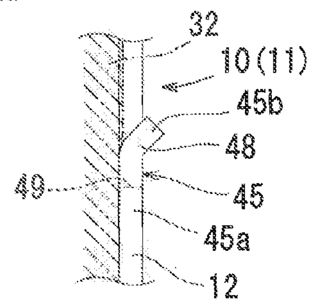
FIG. 35 is a view in the direction of arrow XXXV of FIG. 34.

As shown in FIGS. 34 and 35, this embodiment has a configuration in which the cutout groove 48*a* (refer to FIGS. 32 and 33) of the tilt prevention section 45 in Embodiment 11 described above is changed to a split groove 49 having a wide groove width.

Further, technical matters which can be grasped from the above-described embodiments in addition to the technical matters stated in the claims will be described.

(1) The hose clamp according to any one of claims 1 to 4, wherein the clamp body is maintained in a diameter expansion state by making the locking section on a side of the operation piece on one side be engaged with the engagement portion on a side of the operation piece on the other side in a state where the pair of operation pieces is offset in opposite directions in the axial direction of the clamp body from a neutral state where the pair of operation pieces faces each other.

(2) The hose clamp according to any one of claims 1 to 4 and the above (1), wherein a guide mechanism which guides the operation section outward in the width direction (in the embodiments, forward) when making the operation section on one side come close to the operation section on the other side is provided between both end portions of the clamp body.

(3) The hose clamp according to claim 2, wherein the tilt prevention section is a protrusion piece-shaped tilt prevention piece.

(4) The hose clamp according to the above (3), wherein a tip portion of the tilt prevention piece is bent to the outside in a radial direction of the clamp body.

(5) The hose clamp according to claim 2, wherein the tilt prevention section is formed in the form of a plate which protrudes axially outward from the inclined side edge of the clamp body and has a side edge that is long in a circumferential direction.

(6) The hose clamp according to the above (5), wherein a corner portion of the tilt prevention section is bent to the outside in a radial direction of the clamp body.

The invention is not limited to the embodiments described above and changes can be made within a scope which does not depart from the gist of the invention. For example, it is acceptable if the leak prevention section has a configuration in which the leak prevention section approximately comes into contact with an area between both end portions of the clamp body 12 in the axial direction of the clamp body 12 and presses the hose 32 during tightening of the hose 32, and for example, the leak prevention piece 28 may be provided at the end portion on the first operation piece 13 side in place of the end portion on the second operation piece 21 side of the clamp body 12 and the contact portion 16 may be provided at the end portion on the second operation piece 21 side in place of the end portion on the first operation piece 13 side of the clamp body 12. Further, in the above-described embodiments, the contact portion 16 comes into point contact with the tip edge (the front end edge) of the leak prevention piece 28. However, the contact portion 16 may be formed so as to be able to come into line contact with the tip edge (the front end edge) of the leak prevention piece 28.

Further, it is acceptable if the expansion restricting section has a configuration in which the expansion restricting section restricts divergence in the opposing direction in the axial direction of the clamp body 12 of the operation section on one side with respect to the operation section on the other side between both the operation sections at the time of release of the engagement of the locking claw 14 with the engagement concavity 22, and for example, an expansion restricting section corresponding to the first operation piece 13 side or the end portion on the first operation piece 13 side may be provided on the second operation piece 21 side and an expansion restricting section corresponding to the second operation piece 21 side or the end portion on the second operation piece 21 side may be provided on the first operation piece 13 side.

Further, any one guide edge of both the guide edges 15 and 27 configuring the guide mechanism may be formed as a contact portion capable of coming into contact with the guide edge on the other side in the form of point contact. Further, it is also possible to omit the guide mechanism. Further, both the guide edges (the guide mechanism) 15 and 27 can also be omitted. Further, the hose clamp 10 may be made of resin in place of metal. Further, the engagement concavity 22 of the second operation piece 21 may be replaced with a locking hole portion which penetrates the second operation piece 21 in a wall thickness direction. Further, a configuration is also possible in which the engagement concavity 22 of the second operation piece 21 is omitted and the second operation piece 21 itself is set as an engagement section.

The invention claimed is:

1. A hose clamp comprising:

a clamp body formed by bending a strip-shaped leaf spring material into an annular shape; and a pair of operation sections having a first operation section and a second operation section, the first operation section extending radially from an end portion of the clamp body and the second operation section extending radially from another end portion of the clamp body, wherein tightening of a hose is made possible by diameter reduction by an elastic restoring force of the clamp body, the clamp body is expanded in diameter by using elastic deformation by bringing the pair of operation sections close to each other, the clamp body has a first inclined side edge and a first opposing side edge at one end side of the clamp body and has a second inclined side edge and a second opposing side edge at the other end side of the clamp body, the first and second inclined side edges each inclined with respect to a straight line extending in a circumferential direction, the first and second opposing side edges being parallel to each other, the first inclined side edge has a first tilt prevention section which prevents radially inward tilt of the first inclined side edge by coming into contact with the hose during tightening of the hose, and the second inclined side edge has a second tilt prevention section which prevents radially inward tilt of the second inclined side edge by coming into contact with the hose during tightening of the hose.

2. The hose clamp according to claim 1, wherein each of the first tilt prevention section and the second tilt prevention section is formed in the form of a plate which protrudes axially outward from each of the first and second inclined side edges of the clamp body and has a side edge that is long in a extends parallel to the straight line extending in the circumferential direction.

3. The hose clamp according to claim 2, wherein a corner portion of each of the first and second tilt prevention sections is bent to the outside in a radial direction of the clamp body.

4. The hose clamp according to claim 1, wherein the each of the first and second tilt prevention sections forms a protrusion extending axially outward from the clamp body.

5. The hose clamp according to claim 4, wherein a tip portion of each of the first and second tilt prevention sections is bent to the outside in a radial direction of the clamp body.

6. The hose clamp according to claim 1, further comprising a leak prevention section which directly comes into contact with an area between both end portions of the clamp body in an axial direction of the clamp body and presses the hose during tightening of the hose.

7. The hose clamp according to claim 1, further comprising a leak prevention section which does not come into contact with an area between both end portions of the clamp body in an axial direction of the clamp body and presses the hose during tightening of the hose.

8. The hose clamp according to claim 1, wherein the first tilt prevention section and the second tilt prevention section are arranged point symmetrically to a center point of the clamp body.

* * * * *